Nov. 6, 1928.
E. N. ROTH
1,690,839
FLEXIBLE PIPE JOINT
Filed Feb. 23, 1926       3 Sheets-Sheet 1
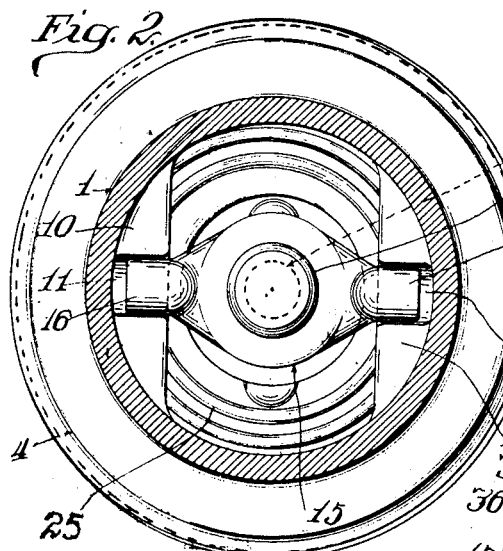
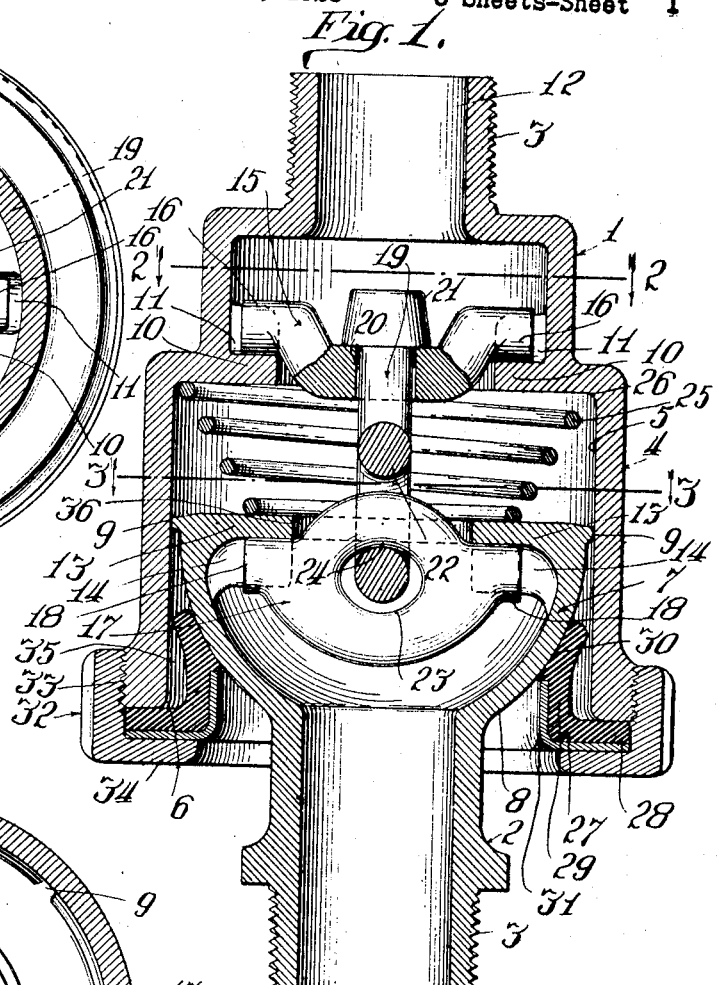
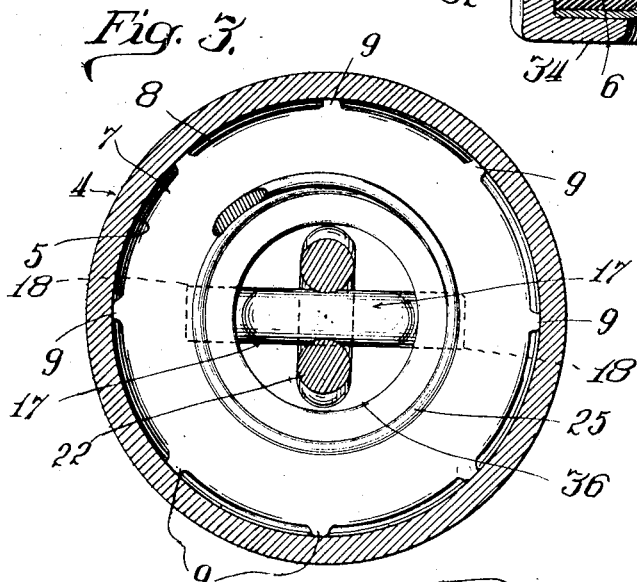
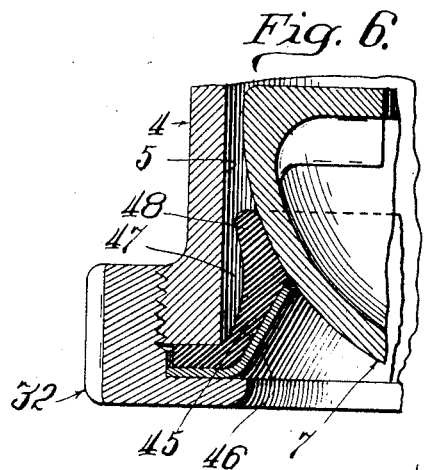
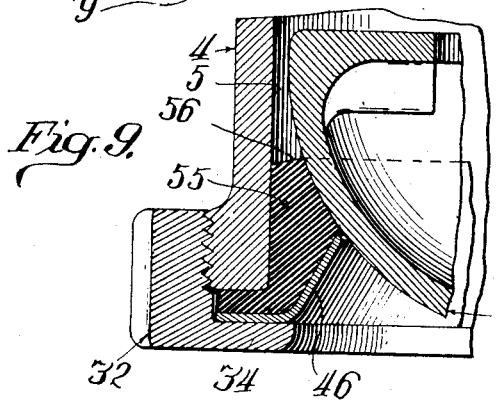
Inventor
Edward N. Roth
By Barnett Truman
Attorney Nov. 6, 1928.  
E. N. ROTH  
1,690,839  
FLEXIBLE PIPE JOINT  
Filed Feb. 23, 1926  
3 Sheets-Sheet 2
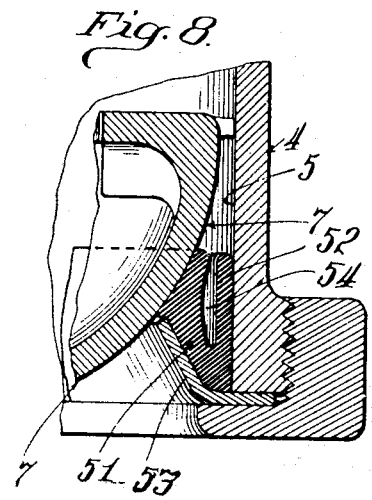
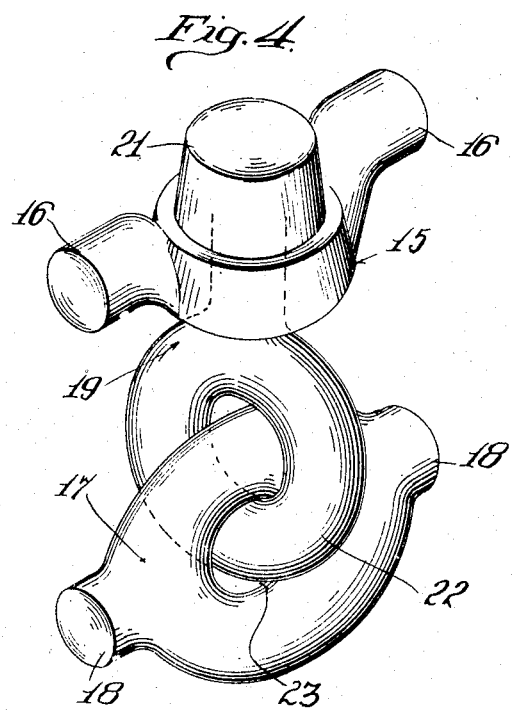
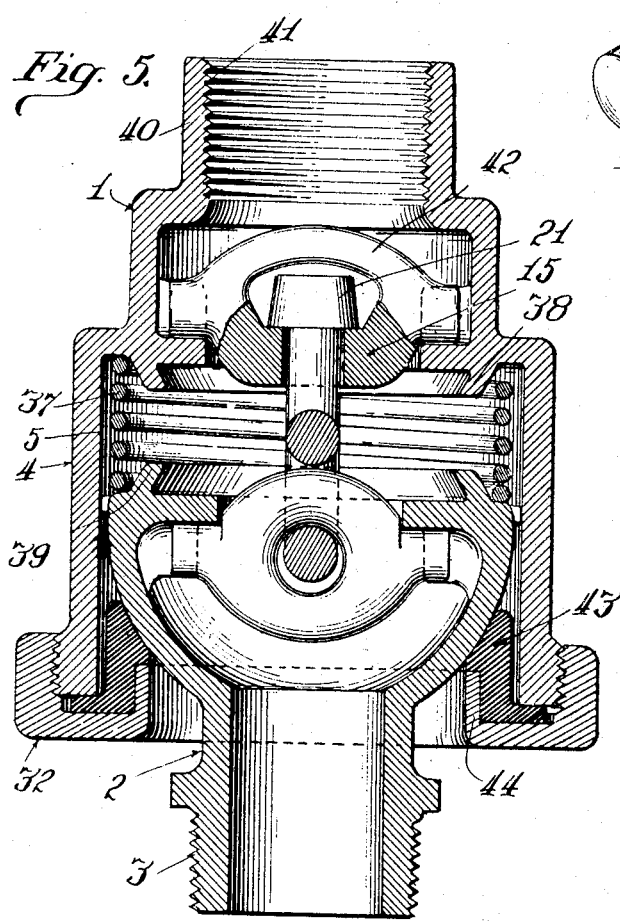
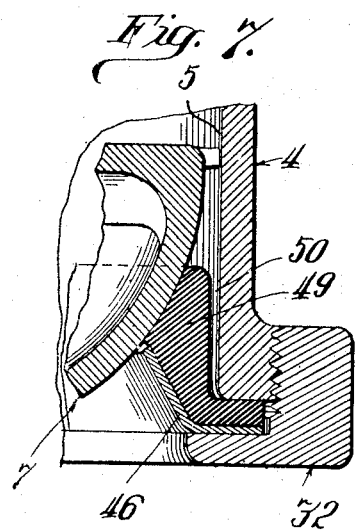
Inventor  
Edward N. Roth  
By Barrett & Truman  
Attorneys Nov. 6, 1928.
E. N. ROTH
1,690,839
FLEXIBLE PIPE JOINT
Filed Feb. 23, 1926   3 Sheets-Sheet 3
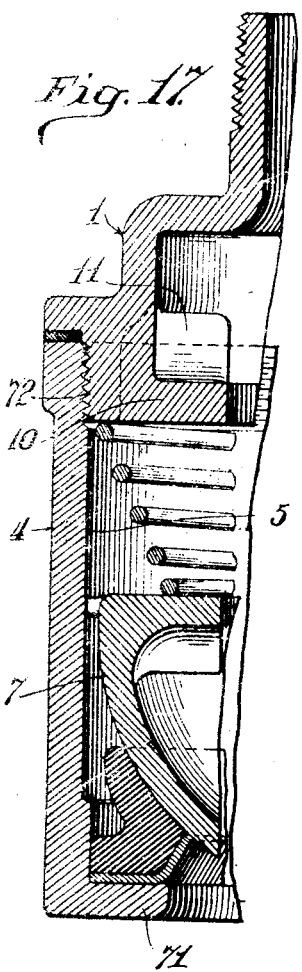
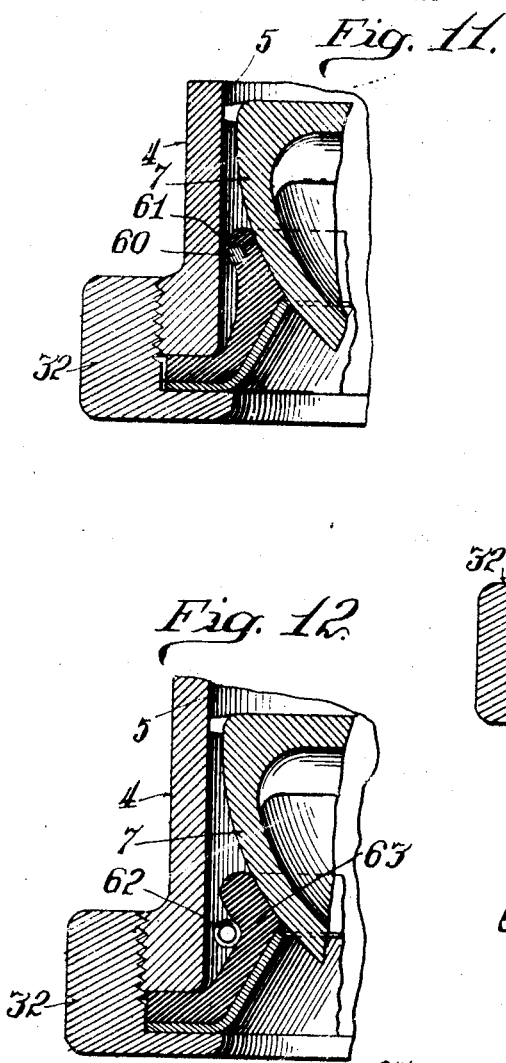
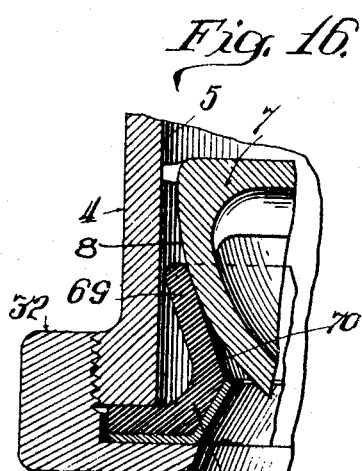
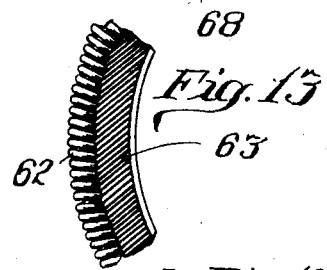
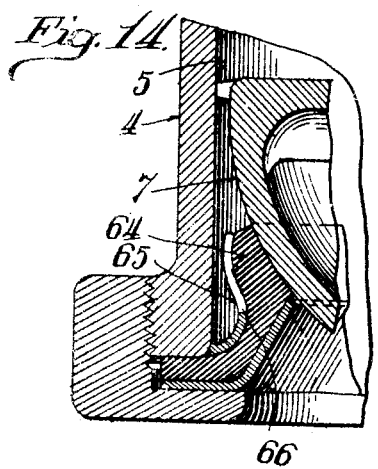
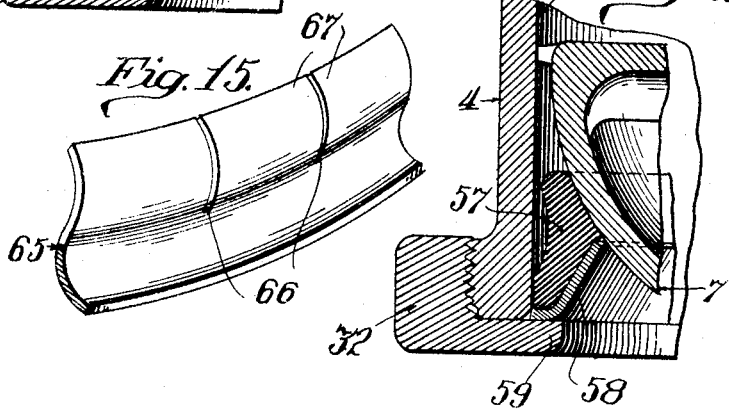
Inventor.
Edward N. Roth
By Barnett & Truman
Attorneys Patented Nov. 6, 1928.

1,690,839

UNITED STATES PATENT OFFICE.

EDWARD N. ROTH, OF CHICAGO, ILLINOIS, ASSIGNOR TO ROTH MANUFACTURING COMPANY, OF CHICAGO, ILLINOIS, A CORPORATION OF ILLINOIS.

FLEXIBLE PIPE JOINT.

Application filed February 23, 1926. Serial No. 89,984.

This invention relates to a flexible pipe joint, particularly adapted for use in the metallic conduit which connects the train pipes on adjacent cars of a railway train. The invention will be described as applied to the coupling or connection between the steam train pipes of the railway train, the improved flexible joint having special utility in this connection. It should be understood, however, that the new pipe joint may be employed in other flexible metallic conduits, wherever an effectively sealed joint permitting universal swinging movement is desired.

The primary object of the invention is to provide a universal pipe joint, more particularly of the ball-and-socket type, which will be flexible under high internal pressures, which will be furnished with effective sealing means between the articulated members of the joint, and which includes means for articulating the members of the joint, one within the other, such means being preferably positioned within said members. This latter feature is advantageous because by positioning the articulation of the joint within the conduit members, said means is protected from injury, and the outside diameter of the joint is reduced to a minimum, and presents no undesirable projections or irregularities.

Another object is to provide a joint of the above type, in which the gasket or sealing means is positioned between the outer or open end of the socket member and the outer surface of the ball member, that is the surface nearest the outer pipe connection. This permits the inner half of the ball member being cut away, that is the ball is substantially hemispherical, whereby the free space within the joint is increased, and the over-all length on the joint may be decreased.

Another object is to provide a form of gasket for use in a joint of the above described type, which is held in effective engagement with the ball member by the fluid pressure within the pipe joint. Several modifications of this gasket are hereinafter disclosed.

Another object is to provide an effective means for mounting and supporting this gasket or sealing means at the open end of the socket member, whereby it may be removed and replaced, without disconnecting the other members of the pipe joint.

Another object is to provide improved means for supporting the gasket or sealing means and holding same yieldably in engagement with the ball member.

Another object is to provide means for holding the ball member centered within the socket member, so as to relieve the gasket or sealing means of the weight of the ball member, without interfering with the universal movement of the ball within the socket.

Another object is to provide a joint of this type in which the interiorly positioned articulating means is simple and compact, and presents only a small obstructing surface to the flow of fluid through the joint.

Another object is to provide a joint of this type which may be easily and quickly assembled or disassembled whereby one or more of the parts may be replaced or repaired.

Another object is to provide a joint of this type, comprising a few simple parts, which may be economically made and are easily assembled.

Other objects and advantages of the invention will be apparent from the following detailed description of certain approved forms of the apparatus.

In the accompanying drawings:

Fig. 1 is a longitudinal central section through one of the assembled flexible pipe joints.

Fig. 2 is a transverse section taken substantially on the line 2—2 of Fig. 1.

Fig. 3 is a transverse section taken substantially on the line 3—3 of Fig. 1.

Fig. 4 is a perspective view of the articulating means.

Fig. 5 is a central longitudinal section, similar to Fig. 1, through a modified form of joint.

Figs. 6 to 17 inclusive are detailed views of different modifications of the gasket or sealing means, for sealing the joint between the socket and ball members, and of the members for supporting these gaskets and holding same in ball-engaging position.

Referring first to Figs. 1 to 4 inclusive, the reference characters 1 and 2 designate the two conduit members of the joint, one end of each of the members being exteriorly threaded at 3 to connect with the adjacent section of the conduit pipe. The free end portion of the body member 1, which is preferably a malleable iron casting, is enlarged to form a socket member 4, which is hollow and interiorly cylindrical at 5, this cylindrical socket extending to the free open end 6. The free end portion of the conduit member 2, which is preferably a brass casting, is formed with an enlarged hollow head or ball member 7, of such diameter that it may be freely inserted within the cylindrical recess 5, in socket member 4. This enlarged head or ball member 7 is only hemispherical, or half of the usual ball, the outer hemispherical surface 8 being centrally connected with the conduit member 2. The outer spherical surface 8 of the ball member is of somewhat less diameter than the inner cylindrical surface 5 of the socket member 4, so that there will never be any engagement between these surfaces. However, a series of spaced lugs 9 are provided about the free edge of the hemispherical head 7 for engaging slidably with the inner surface 5 of the socket member, to hold the ball member centered within the socket member, and support its weight when the members are extended horizontally. This is to prevent the weight of the ball member resting upon the gasket or sealing means, hereinafter described, whereby the gasket would be distorted, and lose its effectiveness.

Articulating means are provided to hold the ball member against withdrawal from the socket member, but permit its universal movement therein. A pair of diametrically disposed lugs 10 extend inwardly in the conduit member 1, at the rear end of the socket portion 4. Each of these lugs 10 is notched or recessed as at 11, the open sides of the recesses extending toward the outlet end 12 of the conduit 1. A pair of similar lugs 13, recessed at 14, are diametrically disposed at the large open end of the hemispherical head 7. The open sides of the recesses 14 face toward the open outlet end 15 of the conduit member 2. A transverse link 15 has cylindrical ends 16 adapted to engage freely and rest in the semicylindrical recesses 11 in the lugs 10. A second transverse link member 17 has cylindrical ends 18 adapted to engage in the semicylindrical recesses 14 in the lugs 13. The articulating bolt 19 is swiveled in a central opening 20 in the link 15, the bolt having an enlarged head 21 engaging against the outer face of the link. The other end of the bolt 19 is formed with a loop 22 which extends through a transverse hole or opening 23 in the link 17. When in operating position, the rounded engaging surfaces of the loop 22 and link 17 will have a rocking engagement at 24 at substantially the center of the ball member 7. It will be noted that the ball member 7 and the link 17 can swing together as a unit, in one direction, about the center 24 on loop 22, and that the ball member 7 can swing in the opposite transverse direction about the cylindrical ends 18 of the link 17. The combination of these two pivotal movements will permit universal swinging movement of the ball member 7 within the socket 4. At the same time, the articulating means comprising the two links 15 and 17 and the bolt 19, will resist the fluid pressure within the pipe joint, and the weight of the parts, and prevent the withdrawal of the ball member from the socket member. The swiveled connection between the bolt 19 and the link 15 will permit rotation of the ball member within the socket member about the longitudinal axis of the joint. A compression spring 25, confined between the inner end of the socket 4 and the inner end of the ball or head 7, keeps the articulating means distended, and the parts in proper operative position when fluid pressure is absent from the pipe joint. In the form shown in Fig. 1, this spring is of volute or spiral form, with its larger end engaging in the end of the cylindrical recess 5. This serves to hold the spring in centered position. This type of spring also has the advantage of permitting greater compression when the articulating means is being assembled, as hereinafter described, and thus permits shortening the overall length of the pipe joint.

The bolt 19 and the two links 15 and 17, which three members comprise the articulating connection, are preferably cast together in the form shown, so that although freely interlocked with one another, they form substantially a single unit when assembling or disassembling the joint.

A gasket member 27, of suitable composition material, has an outer laterally extending flange 28, and an inwardly extending flange 29, terminating in an enlarged head portion having a curved surface 30 adapted to engage the outer spherical surface 8 of the ball member 7. An annular metallic reenforcing ring 31 has two flange portions extending at substantially right angles to one another, and adapted to fit against the outer surfaces of and support the respective flanges 28 and 29 of the annular gasket 27. A clamping ring 32 is interiorly threaded at 33 to detachably engage the outer surface of the end 6 of socket member 4, the clamping ring 32 having an inwardly extending flange 34 adapted to clamp the outwardly extending flanges of the gasket and reinforcing ring against the open end of the socket member. When assembled in this position, an annular space 35 will be left between the inwardly extending flange 29 of the gasket, and the inner wall 5 of the socket member, so that the fluid under pressure within the joint, will pass into this space and hold the gasket tightly against the spherical surface 8 of ball 7.

In order to assemble this pipe joint, the articulating connection is first inserted within the open end of socket member 1, and the arms 16 of link 15 hooked within the recesses 11 in the lugs 10. The spring 25 and head 7 of member 2 are then successively positioned within the socket 4. It will be noted that the ball supporting link 17 may tilt freely about the loop 22 of the bolt 19, so that the ends 18 of the link may be successively passed through the open end 36 of the ball member 7. The ball member 7 is now pushed further into the socket 4, compressing the spring 25, and rotated until the lugs 13 are in line with the arms 18 of the link 17, and when the member 2 is released the expansion of spring 25 will cause the arms 18 to engage and be held within the recesses 14 in the lugs 13. The proper engagement of these parts may be assisted with the aid of a suitable pair of pliers or other tool inserted through the open outer end of the conduit member 2. The gasket 27 and reinforcing ring 31 are now positioned within the open end of the socket member, with the annular head 29 of the gasket in engagement with the spherical surface 8 of the ball member, and the gasket and ring are clamped in position by screwing the clamping ring 32 onto the end of socket member 4. When the flexible joint is in service, the steam or other fluid under pressure within the joint, will pass between the lugs 9, and the ball and socket members, into the space 35 and press the gasket member tightly against the spherical surface of the ball to insure a fluid tight joint between the ball and socket members. The articulating connection resists all longitudinal forces tending to expel the ball member from the socket, and the lugs 9 tend to support the ball laterally within the socket, so that the gasket 29 need never serve as a support in any way for the ball member, its only function being to serve as a sealing means between the ball and socket members. In this way it will be effective and durable and will need little attention. When the gasket becomes worn or otherwise ineffective, it may be renewed or replaced by simply removing the clamping ring 32, there being no need of disassembling the other portions of the flexible joint. When the articulating means becomes worn, it may be easily removed and replaced by another articulating unit by a reversal of the operations for assembling the joint, as hereinabove described.

The modified form of flexible joint shown in Fig. 5, is in many respects the same as the form shown in Figs. 1 to 4 and hereinabove described, and only the distinguishing features will be referred to. In this modification, an ordinary helical compression spring 37 is used, this spring being held in central position and out of engagement with the inner cylindrical surface 5 of socket 4, by means of an inwardly extending annular flange 38 on the socket member, and a similar annular flange 39 projecting from the end of ball member 7. The conduit member 1 is here shown as formed with a larger outer end 40 provided with interior female threads 41, for connecting with the adjacent pipe member. When the member is formed with this larger end portion, the transverse link 15 may be provided with a strengthening arch or rib 42 connecting the arms 16 and bridging the head 21 of the articulating bolt 19. The gasket 43, shown in Fig. 5, is somewhat heavier than the gasket 27 shown in Fig. 1, and the reinforcing ring 31 is omitted, the clamping ring 32 being provided with an interior cylindrical flange 44 which takes the place of the reinforcing ring 31, previously described, in supporting the inner flange of the gasket. Obviously, any one or more of the modified features shown in Fig. 5 could be used in connection with the other features first described in connection with Figs. 1 to 4.

In Figs. 6 to 17 inclusive are illustrated a few of the numerous modifications that may be resorted to in the form of the gasket and its supporting members. In Fig. 6 the gasket is secured to the socket member 4 by clamping ring 32 in substantially the same manner as in Fig. 1. The inner flange 45 of this gasket, and the inner flange 46 of the reinforcing ring, extend diagonally inward toward the ball member, so that space is provided for an enlarged curved pocket 47 between the gasket and the socket member to insure an effective fluid pressure behind the gasket for holding the head 48 of the gasket firmly against the ball.

In the modification shown in Fig. 7, the enlarged pocket 47 is omitted, but the remaining features are much the same as in Fig. 6. This permits the formation of a thicker and stronger head 49 on the gasket, a narrow annular space 50 remaining between the gasket and the socket member for receiving the fluid under pressure.

In Fig. 8 the outwardly extending lateral flange of the gasket is omitted, and the gasket is formed of an annular U-shape with an inner flange 51 extending into engagement with the ball, and an outer flange 52 engaging against the inner surface 5 of the socket 4. The gasket is supported between the inner flange 53 of the reinforcing ring and the inner wall of the socket member 4. A space or pocket 54 remains between the flanges 51 and 52 of the gasket for the reception of the fluid under pressure which serves to expand the flanges of the gasket against the ball and socket respectively.

In Fig. 9 the gasket 55 is made solid and of a size sufficient to entirely fill the space between the adjacent portions of the ball and socket members. In this form the pressure of the fluid against the upper annular face 56 of the gasket is depended upon to expand the gasket against the ball member.

In Fig. 10 the gasket 57 and reinforcing ring 58 are much the same as shown in Fig. 6, with the exception that the outwardly extending flange of each is omitted, and the members are simply held in place within the socket by being supported upon the lip 59 of the clamping ring 32.

In Figs. 11 to 15 inclusive, additional means is provided to assist the fluid pressure in holding the gasket snugly against the ball member. In Fig. 11 a split metallic ring 60 is embedded in an annular groove 61 in the outer face of the gasket for holding the gasket yieldably against the ball 7. The gasket and its supporting devices, as shown in Fig. 11, are substantially the same as those shown in Fig. 6, but obviously this auxiliary ring 60 might be used in connection with other modified forms of the gasket, and the same is true of the other spring-holding devices hereinafter described. In Fig. 12, an annular coiled spring 62, a section of which is shown in Fig. 13, is confined in a groove in the rear of the gasket 63 for holding the gasket yieldably against the ball member. In Fig. 14, the rear surface of the gasket 64 is engaged by an annular plate spring 65, the upper portion of the plate or ring 65 being split at intervals, as at 66, to provide a plurality of spring fingers 67 which hold the gasket 64 yieldably against the ball. A section of the spring 65 is shown in perspective in Fig. 15.

In Fig. 16, the annular gasket comprises a diagonally inwardly extending flange 68, which terminates in a reversely bent flange 69 which extends into the socket member, but outwardly toward the walls of the socket, so that the inner flat face 70 of flange 69 is substantially tangent to the spherical surface 8 of the ball. This form of gasket provides substantially a line contact between the ball and gasket, and provides for considerable longitudinal adjustment of the ball within the socket without affecting the proper engagement between the surfaces of the ball and gasket member.

In the modification shown in Fig. 17, the clamping ring is omitted, but the socket member 4 is provided with an inturned flange 71 at its open end, which flange performs the function of the flange 34 of the clamping ring 32 in holding the gasket and reinforcing ring in place. The socket member 4 (or the equivalent of this portion of the form shown in Fig. 1), is detachably threaded at 72 onto the end of the conduit member 1, which terminates just beyond the lugs 10. Otherwise the parts are the same as in any of the modifications hereinabove described. In this form of joint, by removing the socket portion 4, in the same way that the clamping ring 32 is removed in the other modifications, nearly all of the operating parts can be exposed without disconnecting the different portions of the joint or removing the articulating means. This modified form of joint is somewhat easier to clean, and, in some respects, is somewhat easier to assemble since the different parts of the joint are more accessible and more flexibly connected until the housing or socket member 4 is secured in place.

I claim:

1. A flexible pipe joint, comprising a socket member and a member with an enlarged head which is housed within the socket, sealing means carried at the open end of the socket member and engaging behind the enlarged head, means projecting outwardly from the head and engaging the inner walls of the socket for centering the head within the socket, and articulating means for preventing withdrawal of the head from the socket, the centering means and articulating means supporting the head independently of the sealing means, but permitting universal swinging movement of the head in the socket.

2. In a flexible pipe joint, a pair of interfitting hollow members, comprising a socket member having an open end into which loosely projects the enlarged head of the other member, the head having an annular series of lugs engaging the inner surface of the socket to hold the head centered therein, a substantially hemispherical outer surface extending from the lugs to the outer pipe connection, an annular gasket secured to the open end of the socket member and engaging the hemispherical surface on the head, and articulating means within the hollow members for connecting them with capacity for universal relative movement.

3. In a flexible pipe joint, a pair of interfitting hollow members, comprising a socket member having a substantially cylindrical recess, and a ball member having a substantially hemispherical head housed within the recess, with the spherical surface facing toward the open end of the socket, there being a series of lugs on the head slidably engaging the inner surface of the cylindrical recess to hold the ball centered in the socket without interfering with longitudinal movement of the ball member, a compression spring mounted between the inner end of the ball member and the inner end of the recess, articulating means connecting the ball and socket members comprising a transverse link in the ball, a transverse link in the socket and a bolt flexibly connecting the two links, a clamping ring secured to the end of the socket member, and an annular gasket secured at its outer edge by the clamping ring to the socket member, the gasket projecting into the socket and engaging the spherical surface on the ball and being held against the ball by the fluid pressure within the pipe joint.

4. In a flexible pipe joint of the ball and socket type, the combination with a hollow socket member having an open end, a hollow member projecting within the open end of the socket, and having a hollow ball portion housed within the socket, and articulating means interiorly connecting the ball and socket members, of means for sealing the joint between the open end of the socket and the adjacent outwardly facing surface of the ball comprising a clamping ring detachably engaging the open end of the socket member, and an annular gasket having an outer flange which is clamped to the socket by the clamping ring and an inner flange engaging the outwardly facing surface of the ball.

5. In a flexible pipe joint of the ball and socket type, the combination with a hollow socket member having an open end, a hollow member projecting within the open end of the socket, and having a hollow ball portion housed within the socket, and articulating means interiorly connecting the ball and socket members, of means for sealing the joint between the open end of the socket and the adjacent outwardly facing surface of the ball comprising a clamping ring detachably engaging the open end of the socket member, and an annular gasket having an inner flange which projects into the socket in spaced relation to the inner wall of the socket and engages the outwardly facing surface of the ball.

6. In a flexible pipe joint of the ball and socket type, the combination with a hollow socket member having an open end, a hollow member projecting within the open end of the socket and having a hollow ball portion housed within the socket, and articulating means interiorly connecting the ball and socket members, of means for sealing the joint between the open end of the socket and the adjacent outwardly facing surface of the ball comprising a clamping ring detachably engaging the open end of the socket member, an annular gasket having an inwardly projecting ball-engaging flange and an outwardly projecting flange, and a metallic ring having inner and outer flanges supporting the corresponding flanges of the gasket, the outer flanges of the gasket and supporting ring being secured to the socket member by the clamping ring.

7. In a flexible pipe joint of the ball and socket type, the combination with a hollow socket member having an open end, a hollow ball member housed within the open end of the socket, and articulating means connecting the ball and socket members, of means for sealing the joint between the outer face of the ball and the open end of the socket comprising a clamping ring detachably engaging the open end of the socket member, an annular gasket having an inwardly projecting ball-engaging flange and an outwardly projecting flange, and a metallic ring having inner and outer flanges supporting the corresponding flanges of the gasket, the outer flanges of the gasket and supporting ring being secured to the socket member by the clamping ring, and yieldable means for holding the inner flange of the gasket in engagement with the ball.

8. In a flexible pipe joint of the ball and socket type, the combination with a hollow socket member having an open end, a hollow ball member housed within the open end of the socket, and articulating means connecting the ball and socket members, of means for sealing the joint between the outer face of the ball and the open end of the socket comprising a clamping ring detachably engaging the open end of the socket member, an annular gasket having an inwardly projecting ball-engaging flange and an outwardly projecting flange, and a metallic ring having inner and outer flanges supporting the corresponding flanges of the gasket, the outer flanges of the gasket and supporting ring being secured to the socket member by the clamping ring and a spring surrounding the inner flange of the gasket and holding same yieldably in engagement with the ball.

9. In a flexible pipe joint of the ball and socket type, the combination with a hollow socket member having an open end, a hollow ball member housed within the open end of the socket, and articulating means connecting the ball and socket members, of means for sealing the joint between the outer face of the ball and the open end of the socket comprising a clamping ring detachably engaging the open end of the socket member, a reinforcing ring supported by the clamping ring and having a flange extending diagonally into the socket, and a gasket having an outer flange clamped to the socket, an intermediate portion extending toward the ball and supported by the reinforcing ring, and an inner flange extending into the socket with one face substantially tangent to the spherical surface of the ball.

10. In a flexible pipe joint, a pair of hollow interfitting members one of which is a socket member having an open end, the other member projecting into the open end and expanded continuously to form a hemispherical head housed within the socket, the outer hemispherical surface of the head facing the open end of the socket from within the socket, an annular gasket secured to the open end of the socket and projecting into the socket into engagement with the hemispherical surface, and articulating means independent of the hemispherical surface connecting the members to permit universal movement of the head in the socket but prevent its withdrawal therefrom.

11. In a flexible pipe joint, a pair of hollow interfittting members one of which is a socket member having an open end, the other member projecting into the open end and expanded continuously to form a hemispherical head housed within the socket, the outer hemispherical surface of the head facing the open end of the socket from within the socket, an annular gasket secured to the open end of the socket and projecting into the socket into engagement with the hemispherical surface, and articulating means interiorly connecting the members to permit universal movement of the head in the socket but prevent its withdrawal therefrom.

12. In a flexible pipe joint, a pair of hollow interfitting members one of which is a socket member having an open end, the other member projecting into the open end and expanded continuously to form a hemispherical head housed within the socket, the outer hemispherical surface of the head facing the open end of the socket from within the socket, an annular gasket secured to the open end of the socket and projecting into the socket into engagement with the hemispherical surface, and articulating means interiorly connecting the members comprising a transverse link within the socket, a transverse link within the head, and a longitudinal bolt flexibly connecting the transverse members.

13. In a flexible pipe joint, a pair of hollow interfitting members one of which is a socket member having an open end, the other member projecting into the open end and expanded continuously to form a hemispherical head housed within the socket, the outer hemispherical surface of the head facing the open end of the socket from within the socket, an annular gasket secured to the open end of the socket and projecting into the socket into engagement with the hemispherical surface, and articulating means interiorly connecting the members comprising a transverse link within the socket, a transverse link within the head, and a longitudinal bolt swiveled in one transverse link and pivotally engaged with the other link.

14. In a flexible pipe joint, a pair of hollow interfitting members one of which is a socket member having an open end, the other member projecting into the open end and expanded continuously to form a hemispherical head housed within the socket, the outer hemispherical surface of the head facing the open end of the socket from within the socket, an annular gasket secured to the open end of the socket and projecting into the socket into engagement with the hemispherical surface, and articulating means interiorly connecting the members comprising a transverse link within the socket, a transverse link within the head, and a longitudinal bolt swiveled in one transverse link and having a looped end pivotally engaged with the other transverse link.

15. In a flexible pipe joint, a pair of hollow interfitting members one of which is a socket member having an open end, the other member projecting into the open end and expanded continuously to form a hemispherical head housed within the socket, the outer hemispherical surface of the head facing the open end of the socket from within the socket, an annular gasket secured to the open end of the socket and projecting into the socket into engagement with the hemispherical surface, a spring mounted within the socket and tending to force the head out of the socket and against the gasket, and articulating means interiorly connecting the members to hold the head within the socket but permit universal movement of the head.

16. In a flexible pipe joint, a pair of hollow interfitting members one of which is a socket member having an open end, the other member projecting into the open end and expanded continuously to form a hemispherical head housed within the socket, the outer hemispherical surface of the head facing the open end of the socket from within the socket, an annular gasket secured to the open end of the socket and projecting into the socket into engagement with the hemispherical surface, means independent of the gasket for centering the head within the socket, and articulating means independent of the hemispherical surface connecting the members to permit universal movement of the head in the socket but prevent its withdrawal therefrom.

17. In a flexible pipe joint of the ball and socket type, the combination with a hollow socket member having an open end, a hollow ball member projecting into the socket and terminating in a ball member housed entirely within the socket, and articulating means connecting the ball and socket members, of means for sealing the joint between the ball and socket comprising an annular gasket having an outer portion secured to the socket adjacent its open end, and an inner portion of less diameter than the maximum diameter of the ball, projecting into the socket to engage the outer hemispherical surface of the ball which faces the open end of the socket from within the socket.

EDWARD N. ROTH.